United States Patent
Makino

(10) Patent No.: US 9,631,584 B2
(45) Date of Patent: Apr. 25, 2017

(54) HEAT STORAGE MEMBER FOR CANISTER

(71) Applicant: AISAN KOGYO KABUSHIKI KAISHA, Obu-shi, Aichi-ken (JP)

(72) Inventor: Katsuhiko Makino, Aichi-ken (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 0 days.

(21) Appl. No.: 14/513,928

(22) Filed: Oct. 14, 2014

(65) Prior Publication Data

US 2015/0107561 A1 Apr. 23, 2015

(30) Foreign Application Priority Data

Oct. 17, 2013 (JP) .................................. 2013-216280

(51) Int. Cl.
F02M 25/08 (2006.01)
B60K 15/035 (2006.01)

(52) U.S. Cl.
CPC ............... *F02M 25/0854* (2013.01); *B60K 2015/03514* (2013.01); *F02M 2025/0881* (2013.01)

(58) Field of Classification Search
CPC ....... F02M 25/0854; F02M 2025/0881; C09K 5/063; B01D 2257/704; B01D 2259/40086; B01D 2259/4516; B01D 53/02; B01D 53/0407; B60K 2015/03514
USPC ............ 123/516–525; 96/121, 131, 132, 152
See application file for complete search history.

(56) References Cited

U.S. PATENT DOCUMENTS

| | | | | |
|---|---|---|---|---|
| 7,670,412 B2* | 3/2010 | Kido | ................. | B01D 53/0438 123/519 |
| 7,841,321 B2* | 11/2010 | Kosugi | .............. | F02M 25/0854 123/519 |
| 2008/0302245 A1* | 12/2008 | Yoshida | ............. | B01D 53/0415 96/146 |
| 2009/0223370 A1* | 9/2009 | Kosugi | .............. | B01D 53/0407 96/126 |
| 2009/0229580 A1* | 9/2009 | Kopinsky | .............. | B60K 15/03 123/519 |
| 2009/0266236 A1* | 10/2009 | Kosugi | .............. | B01D 53/0415 96/152 |

(Continued)

FOREIGN PATENT DOCUMENTS

| | | |
|---|---|---|
| JP | H04-85387 A | 3/1992 |
| JP | H06-99724 A | 4/1994 |

(Continued)

OTHER PUBLICATIONS

Japanese Patent Application No. 2013-216280 Notification of Reasons for Refusal dated Dec. 27, 2016 (6 pages).

*Primary Examiner* — Long T Tran
(74) *Attorney, Agent, or Firm* — Conley Rose, P.C.

(57) ABSTRACT

A heat storage member housed in a canister together with an adsorbent capable of adsorbing fuel vapor has a sealed container and a phase-change material housed in the sealed container. The phase-change material becomes semisolid gel state at the melting point of the phase-change material. The phase-change material is disposed along an entire inner surface of the sealed container such that a space capable of compensating for volume alteration of the phase-change material caused by phase-change is formed at a center of an inner space of the sealed container.

2 Claims, 5 Drawing Sheets

(56) References Cited

U.S. PATENT DOCUMENTS

2009/0293728 A1* 12/2009 Kosugi .............. B01D 53/0407
  96/154
2009/0294094 A1* 12/2009 Suzuki ................. F28D 20/023
  165/10
2010/0147152 A1* 6/2010 Kosugi .............. B01D 53/0415
  96/146

FOREIGN PATENT DOCUMENTS

| JP | 2002-162182 A | 6/2002 |
| JP | 2008-38688 A | 2/2008 |
| JP | 2009-215938 A | 9/2009 |

* cited by examiner

HEAT STORAGE MEMBER FOR CANISTER

CROSS-REFERENCE TO RELATED APPLICATIONS

This application claims priority to Japanese patent application serial number 2013-216280, filed Oct. 17, 2013, the contents of which are incorporated herein by reference in their entirety for all purposes.

BACKGROUND

This disclosure relates to heat storage members for canisters. The heat storage members and phase-change material are housed in the canister configured to adsorb fuel vapor, which has vaporized in a fuel tank. The phase-change materials decrease temperature alteration in the canister by using latent heat generated during solidification or melting.

Japanese Laid-Open Patent Publication No. 2009-215938 belonging to the applicant of this application discloses heat storage members. In Japanese Laid-Open Patent Publication No. 2009-215938, for example, hexadecane ($C_{16}H_{34}$) having the melting point at 18° C. is used as the phase-change material housed in the sealed container. This phase-change material changes to liquid at its melting point (and above the melting point). Because its volume increases during the phase-change from solid into liquid, a space capable of accepting increase in volume of the phase-change material is provided between an inner surface of the sealed container and a surface of the phase-change material.

However, when the phase-change material described in Japanese Laid-Open Patent publication No. 2009-215938 melts, it completely becomes liquid. Thus, when inertial force referred to as G caused by acceleration and deceleration or cornering during driving is applied to the phase-change material, it moves in the sealed container such that the contact location and contact area between the inner surface of the sealed container and the phase-change material fluctuates. Therefore, thermal conductivity from an outer space around the heat storage member to the phase-change material via the sealed container varies, so that a heat storage effect (i.e., an effect of decrease in temperature alteration) is unstable.

Further, because Japanese Laid-Open Patent Publication No. 2009-215938 is based on the premise that the phase-change material completely becomes liquid when it melts, the space capable of accepting increase in volume of the phase-change material is provided between the inner surface of the sealed container and the surface of the phase-change material. Accordingly, there is always a part of the sealed container not contacting the phase-change material, so that it is difficult to efficiently conduct heat from the outer space to the phase-change material throughout the heat storage member. Accordingly, there is a need for improved heat storage members for the canister.

BRIEF SUMMARY

In one aspect of this disclosure, a heat storage member housed in a canister together with an adsorbent capable of adsorbing fuel vapor has a sealed container and a phase-change material housed in the sealed container. The phase-change material becomes semisolid gel state at the melting point of the phase-change material. The phase-change material is disposed along an entire inner surface of the sealed container such that a space capable of compensating for volume alteration of the phase-change material caused by phase-change is formed at a center of an inner space of the sealed container.

In accordance with this aspect, when the temperature of the phase-change material reaches at the melting point, the phase-change material does not become liquid completely but becomes semisolid gel state such that the phase-change material can retain its shape and does not move therefrom when inertial force is applied to the phase-change material during driving. Accordingly, because a contact position and a contact area between the sealed container and the phase-change material are always maintained, thermal conductivity from a space surrounding the heat storage member to the phase-change material via the sealed container is stable, and a heat storage efficiency (i.e., prevention effect in temperature alteration) is also stable. Further, because the phase-change material can retain its shape at the melting point, the space capable of compensating for volume alteration of the phase-change material caused by phase-change is formed at the center of the inner space of the sealed container and the phase-change material is disposed along the entire inner surface of the sealed container in order to maximize the contact area between the phase-change material and the sealed container. Accordingly, heat can be efficiently transferred from the outside to the phase-change material throughout the heat storage member.

DETAILED DESCRIPTION

Each of the additional features and teachings disclosed above and below may be utilized separately or in conjunction with other features and teachings to provide improved heat storage members. Representative examples, which utilize many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples. Moreover, various features of the representative examples and the dependent claims may be combined in ways that are not specifically enumerated in order to provide additional useful embodiments of the present teachings.

First, a canister configured to house heat storage members of this disclosure will be described. The canister is mounted on a vehicle such as automobile using highly-volatile liquid fuel such as gasoline and is configured to selectively adsorb fuel vapor, which has vaporized in a fuel tank, in order to prevent the fuel vapor from leaking into the atmosphere.

Figure 1:
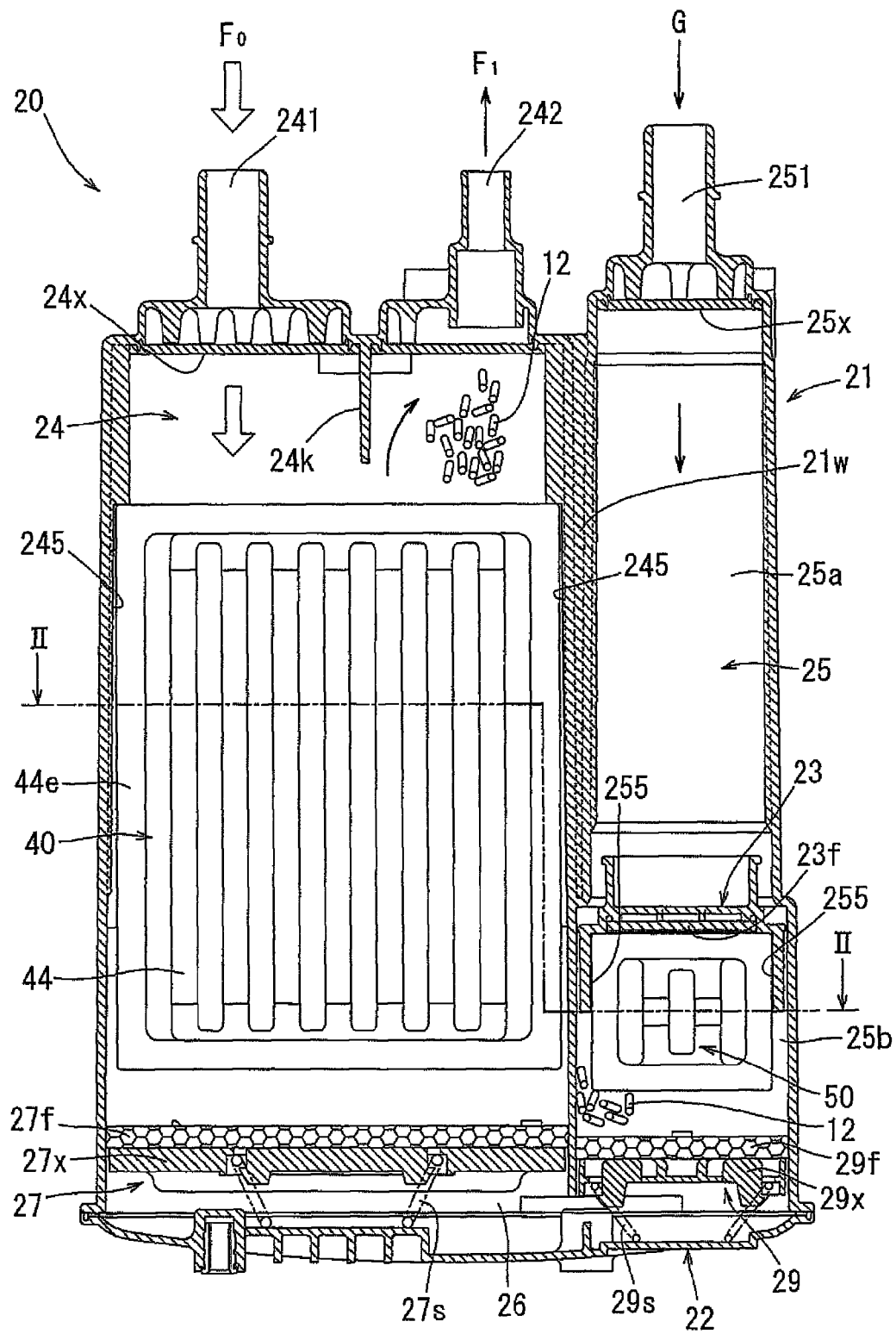
FIG. 1 is a longitudinal cross-sectional view of a canister.
Figure 2:
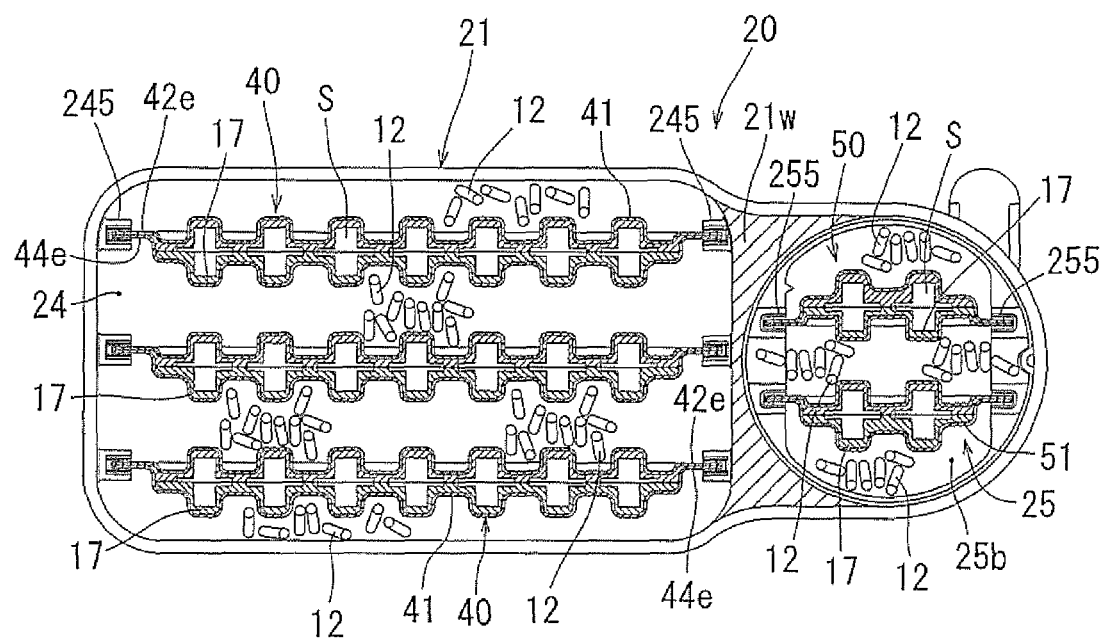
FIG. 2 is a cross-sectional view along a line II-II in FIG. 1.

As shown in FIGS. 1 and 2, a canister 20 has a container body 21 having an inner space divided into a plurality of chambers and a lid 22 configured to close an opening (lower end in FIG. 1) of the container body 21. As shown in FIG. 2, the inner space of the container body 21 is divided by a partition wall 21w into a main chamber 24 having a substantial square cross-section and an auxiliary chamber 25 having a substantial round cross-section. Thus, gas flows through a U-shaped flow passage in the canister 20. As shown in FIG. 1, the auxiliary chamber 25 is divided by a buffer plate 23 into a first auxiliary chamber 25a and a second auxiliary chamber 25b.

The container body 21 has a tank port 241, a purge port 242 and an air flow port 251 on an upper end portion opposite to the lid 22 such that the tank port 241, the purge port 242 and the air flow port 251 form a row. The tank port 241 is fluidly connected to a fuel tank and functions as an inlet for mixed gas $F_0$ of air and fuel vapor, which has vaporized in the fuel tank. The purge port 242 is fluidly connected to a vacuum pump or an air intake pipe configured to provide air into an internal combustion engine and functions as an outlet for fuel vapor $F_1$, which has been desorbed from the canister 20 when negative pressure is applied to the inner space of the canister 20 by suction air from the vacuum pump or the internal combustion engine. The air flow port 251 is open to the atmosphere and functions as an inlet and an outlet for air G.

The air flow port 251 is fluidly connected to the first auxiliary chamber 25a via a porous plate 25x having many small holes. The tank port 241 and the purge port 242 are fluidly connected to the main chamber 24 via a porous plate 24x having many small holes. An upper wall of the main chamber 24 of the container body 21 has a dividing wall 24k protruding into the main chamber 24. The dividing wall 24k separates an upper space of the main chamber 24 into a first inner space fluidly connected to the tank port 241 and a second inner space fluidly connected to the purge port 242.

As shown in FIG. 2, a plurality (three in this embodiment) of heat storage members 40 are provided in the main chamber 24 of the container body 21 such that the heat storage members 40 are directed along an gas flow direction and are positioned at intervals. The spaces between the heat storage members 40 themselves as well as the spaces between members 40 and the inner surface of the main chamber 24 are filled with an adsorbent 12. The adsorbent 12 is made of activated carbon or the like, which selectively adsorbs fuel vapor and is capable of desorbing fuel vapor during air purge operation. The holes of the porous plate 24x are smaller than the adsorbent 12 in order to keep the adsorbent 12 in the main chamber 24.

As shown in FIG. 1, an opening of the main chamber 24 of the container body 21 is blocked with an inner lid plate 27 after attaching the heat storage members 40 and filling the adsorbent 12 in the main chamber 24. The inner lid plate 27 is a breathable plate composed of a first filter 27f and a porous plate 27x and keeps the adsorbent 12 in the main chamber 24. The inner lid plate 27 is configured to slide along the inner surface of the main chamber 24 while blocking the opening of the main chamber 24. And, one end of a coil spring 27s is attached to a center of a back surface of the inner lid plate 27 such that the coil spring 27s biases the inner lid plate 27. When the opening of the container body 21 is blocked with the lid 22, an inner surface of the lid 22 presses the other end of the coil spring 27s. Thus, the inner lid plate 27 is subjected to force from the coil spring 27s in a direction toward the inside of the main chamber 24. Accordingly, because formation of unwanted space between particles of the adsorbent 12 is prevented, it is able to substantially even out airflow resistance.

The auxiliary chamber 25 of the container body 21 is divided by the buffer plate 23 into the first auxiliary chamber 25a and the second auxiliary chamber 25b as described above, and the buffer plate 23 is equipped with a second filter 23f on the second auxiliary chamber 25b side as shown in FIG. 1. As shown in FIG. 2, the second auxiliary chamber 25b of the container body 21 is provided with a plurality of (two in this embodiment) heat storage members 50 such that the heat storage members 50 are directed along an airflow direction and are positioned at intervals. Spaces between the heat storage members 50 themselves as well as spaces between the members 50 and the inner surface of the second auxiliary chamber 25b are filled with the adsorbent 12. As shown in FIG. 1, an opening of the second auxiliary chamber 25b is blocked with an inner lid plate 29 after attaching the heat storage members 50 and filling the adsorbent 12 in the second auxiliary chamber 25b. The inner lid plate 29 is a breathable plate composed of a third filter 29f and a porous plate 29x and keeps the adsorbent 12 in the second auxiliary chamber 25b. The heat storage members 40 and the heat storage members 50 are formed to have external dimensions such that the heat storage members 40 cover the whole inner space of the main chamber 24 and the heat storage members 50 cover the whole inner space of the auxiliary chamber 25, respectively.

The inner lid plate 29 is configured to slide along the inner surface of the second auxiliary chamber 25b while blocking the opening of the second auxiliary chamber 25b. One end of a coil spring 29s is attached to a center of a back surface of the inner lid plate 29 such that the coil spring 29s biases the inner lid plate 29. When the opening of the container body 21 is blocked with the lid 22, the inner lid plate 29 is subjected to force from the coil spring 29s in a direction toward the inside of the second auxiliary chamber 25b. A diffusion space 26 is defined by the inner lid plate 29 blocking the auxiliary chamber 25b, the inner lid plate 27 blocking the main chamber 24, and the lid 22 and functions as a flow passage fluidly connecting the main chamber 24 with the second auxiliary chamber 25b.

Figure 3:
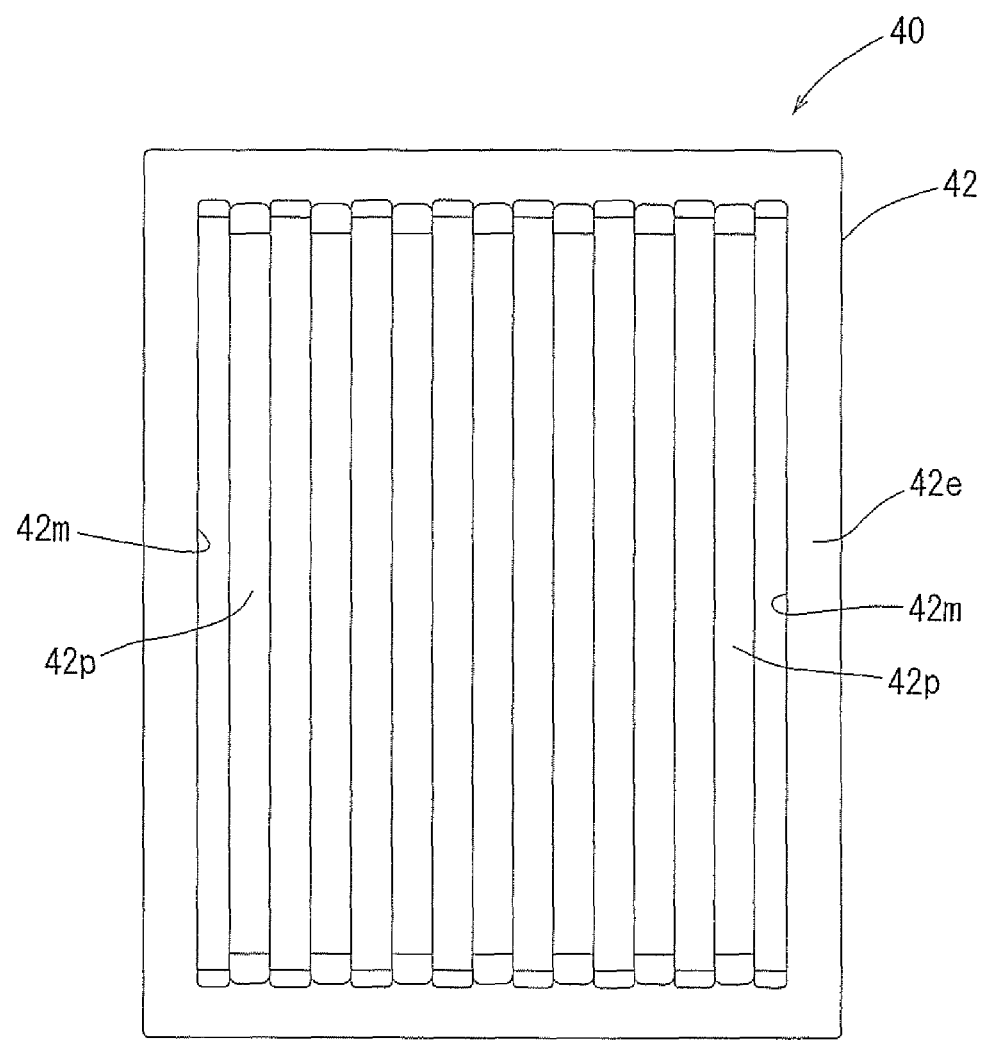
FIG. 3 is a top view of a heat storage member.
Figure 4:
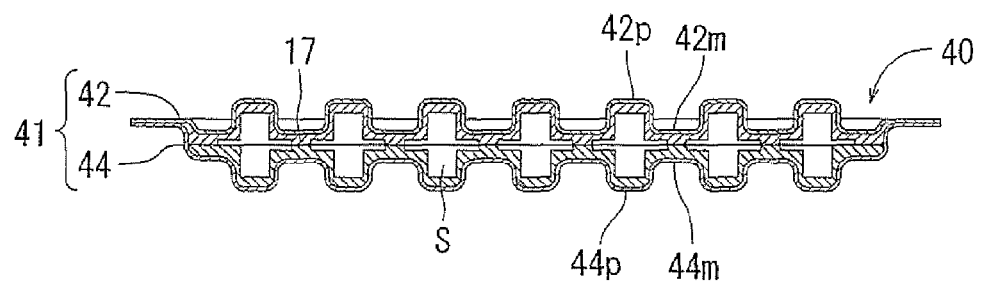
FIG. 4 is a cross-sectional view of the heat storage member.

As shown in FIGS. 2 and 4, each of the heat storage members 40 is composed of a metal sealed container 41 having a certain pressure resistance and a phase-change material 17. The phase-change material 17 is housed in the sealed container 41 and decreases temperature alteration in the canister 20 by using latent heat during solidification and melting. As shown in FIGS. 1, 2, and 3, each sealed container 41 is formed by joining a flange portion 42e of an upper panel 42 formed in a lid shape with a flange portion 44e of a lower panel 44 formed in a shallow open vessel shape. Here, FIG. 1 shows lower surfaces of the heat storage members 40 and 50, and FIG. 3 shows an upper surface of the heat storage member 40. The upper panel 42 is formed in a rectangle shape and has the flange portion 42e at its circumferential edge with a certain width. The upper panel 42 has groove portions 42m and projected rim portions 42p in an area surrounded by the flange portion 42e such that each of the groove portions 42m and the projected rim portions 42p has a rectangular cross-section with a certain width and extends in a longitudinal direction of the upper panel 42 and such that the groove portions 42m and the projected rim portions 42p are alternately arranged. Because the upper panel 42 is formed by press molding of a metal plate, the projected rim portions 42*p* on a upper surface side of the upper panel 42 correspond to groove portions on its lower surface side, and the groove portions 42*m* on the upper surface side correspond to projected rim portions on the lower surface side.

The lower panel 44 is formed in a rectangular shallow box shape and has the flange portion 44*e* with a certain width at its circumferential edge. As is best shown in FIG. 4, the lower panel 44 has groove portions 44*m* and projected rim portions 44*p* on its bottom plate such that each of the groove portions 44*m* and the projected rim portions 44*p* has a rectangular cross-section with a certain width and extends in a longitudinal direction of the lower panel 44 and such that the groove portions 44*m* and the projected rim portions 44*p* are alternately arranged. Because the lower panel 44 is formed by press molding of a metal plate as with the upper panel 42, the projected rim portions 44*p* on a lower surface side of the lower panel 44 (outer surface side of the sealed container 41) correspond to groove portions on its upper surface side (inner surface side of the sealed container 41), and the groove portions 44*m* on the lower surface side correspond to projected rim portions on the upper surface side.

The width and the length of the lower panel 44 is equal to the width and the length of the upper panel 42, respectively, and each width of the groove portions 44*m* and the projected rim portions 44*p* of the lower panel 44 is equal to each width of the groove portions 42*m* and the projected rim portions 42*p* of the upper panel 42. The flange portion 44*e* of the lower panel 44 and the flange portion 42*e* of the upper panel 42 are joined with each other by laser welding or the like in a state where the phase-change material 17 is housed in the sealed container 41. Preferably, the sealed container 41 is made from copper or stainless, etc.

As shown in FIG. 2, the flange portions 42*e* and 44*e* of each heat storage member 40 are fitted into a pair of rail-shaped grooves 245, which are formed on the inner surface of the main chamber 24 of the canister 20 and are located on sides facing in the width direction. Thus, the heat storage members 40 are positioned in the main chamber 24 substantially parallel to the air-flow direction. Here, three pairs of the rail-shaped grooves 245 are formed on the inner surface of the main chamber 24, and upper, middle and lower rail-shaped grooves 245 are positioned at regular intervals in a height direction.

The heat storage members 50 contain the phase-change material 17 in the sealed containers 51 as with the heat storage members 40, and as shown in FIG. 2, each of the heat storage members 50 have a same or similar configuration of the heat storage members 40 and is formed smaller than the heat storage members 40. Accordingly, shared configurations of the heat storage members 50 and the heat storage members 40 are labeled with the same reference numbers as the heat storage members 40 and will not be described.

Each of the flange portions 42*e* and 44*e* of heat storage members 50 includes a pair of edges facing in its width direction. The buffer plate 23 is disposed in the second auxiliary chamber 25*b* of the canister 20, and the buffer plate 23 has pairs of rail-shaped grooves 255 on both surfaces facing in its width direction. The edges of the flange portions 42*e* and 44*e* of each sealed container 51 are fitted into the corresponding pair of the rail-shaped grooves 255. Thus, the heat storage members 50 are fixed in the second auxiliary chamber 25*b* substantially parallel to the air-flow direction. In this embodiment, the second auxiliary chamber 25*b* has two pairs of the rail-shaped grooves 255 on the inner surface of the buffer plate 23 disposed in the second auxiliary chamber 25*b* such that the pairs of the rail-shaped grooves 255 are positioned at a predetermined interval in the height direction.

The phase-change material 17 housed in the heat storage members 40 and 50 is composed of a material, which is solid below its melting point and is semisolid gel state at and above the melting point. In particular, the phase-change material 17 is composed of gel paraffin containing at least one of C15-C18 paraffinic hydrocarbons as main component (having a heat storage effect) and a gelator composed of thermoplastic elastomer. Examples of the C15-C18 paraffinic hydrocarbons are C15 pentadecane having the melting point at 10° C., C16 hexadecane having the melting point at 18° C., C17 heptadecane having the melting point at 21° C., and C18 octadecane having the melting point at 28° C. The gel paraffin contains one or more C15-18 paraffinic hydrocarbons. When the C15-C18 paraffinic hydrocarbons are used as main component of the phase-change material, the melting point of the phase-change material is in a range between about 10° C. and 28° C., and it is able to exert a high heat storage effect at a temperature range between 4° C. and 80° C., which is the general temperature range in the canister. Further, the gelator can be added to the paraffinic hydrocarbon such that the phase-change material becomes semisolid gel state at the melting point.

Co-polymer containing a first structural unit composed of propylene having the melting point higher than 4-80° C., which is a general range of temperature alteration in the canister, and of course is higher than the melting points of the paraffinic hydrocarbons and a second structural unit composed of C2-30 α-olefin (except propylene) can be used as olefin elastomer. The olefin elastomer contains 10-20 mole percent of the propylene structural unit in a condition that total of the propylene structural unit and the α-olefin structural unit is 100 mole percent. Examples of the C2-30 α-olefins (except propylene) are ethylene, 1-butene, 1-pentene, 1-hexene, 4-methyl-1-pentene, 1-octene, 1-decene, 1-dodecene, 1-tetradecene, 1-hexadecene, 1-octadecene, and 1-eicosene. The phase-change material 17 contains 5-20% by weight of olefin elastomer as the gelator.

The olefin elastomer, which is the co-polymer composed of propylene and α-olefin, has a net-like structure in which helical crystalline structures in nanometer size such as 10-50 nm are connected with each other. So, the phase-change material 17 has a structure where the amorphous paraffinic hydrocarbon is held in the net-like structure of olefin elastomer. Thus, when the temperature in the canister reaches at the melting point of the phase-change material 17 (above the melting point of the paraffinic hydrocarbon), heat in the canister 20 is absorbed by the paraffinic hydrocarbon as latent heat of melting in order to prevent temperature increase in the canister 20. In this state, because the net-like structure of the gelator holds the melted paraffinic hydrocarbon, the phase-change material 17 maintains a uniformly-semisolidified gel state having a shape retaining property. Then, when the temperature in the canister 20 decreases, the phase-change material 17 becomes solidified due to solidification of the paraffinic hydrocarbon, and the paraffinic hydrocarbon releases heat during solidification in order to prevent temperature decrease in the canister 20.

When the phase-change material 17 becomes gel state (i.e., the paraffinic hydrocarbon melts), the volume of the phase-change material 17 increases. The phase-change material 17 is located along the entire inner surfaces of the sealed containers 41 and 51, and a space S is formed at the center of an inner space of each of the sealed containers 41 and 51 in order to accept volume alteration of the phase-change material 17 due to its phase-change. Accordingly, breakage of the heat storage members 40 and 50 caused by volume alteration of the phase-change material 17 can be prevented. The space S is preferably filled with inert gas such as argon gas, nitrogen gas or helium gas in order to prevent deterioration of the phase-change material 17.

Figure 5A:
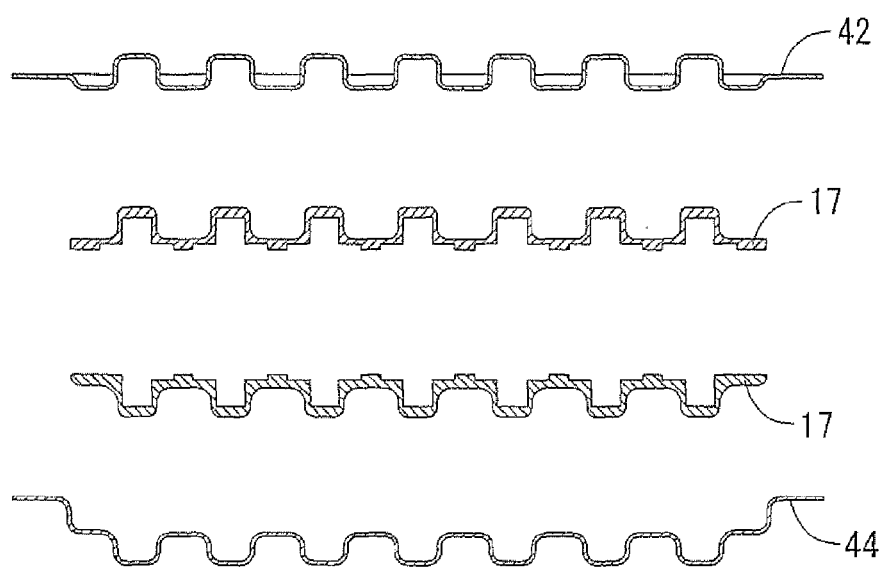
FIGS. 5A and 5B are cross-sectional views each showing a step of a manufacture method of the heat storage member.
Figure 5B:
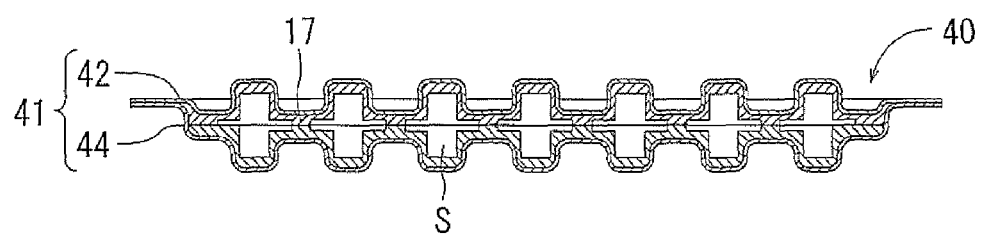

As shown in FIG. 5A, each of the heat storage members 40 (same with the heat storage members 50) is manufactured by forming the phase-change material 17 in a predetermined shape fitting with each of inner surfaces of the upper panel 42 and the lower panel 44, disposing the phase-change material 17 on the inner surfaces of the upper panel 42 and the lower panel 44, and then, as shown in FIG. 5B, welding the flange portion 42e of the upper panel 42 with the flange portion 44e of the lower panel 44.

Figure 6A:
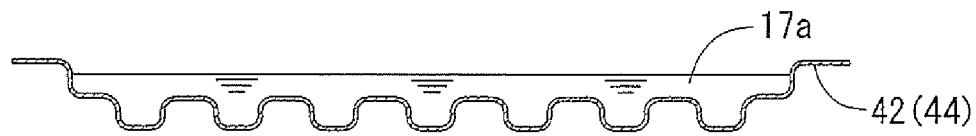
FIG. 6A-6D are cross-sectional views each showing a step of another manufacture method of the heat storage member.
Figure 6B:
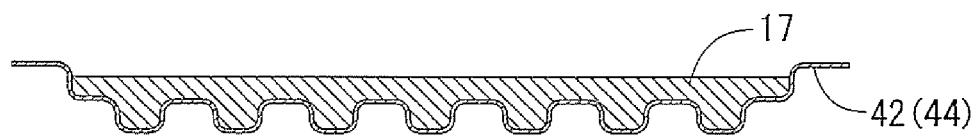
Figure 6C:
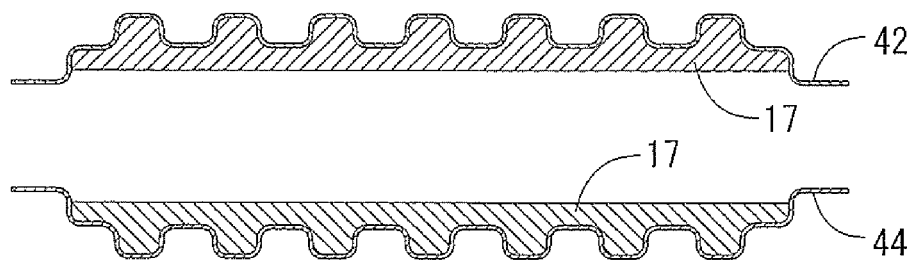
Figure 6D:
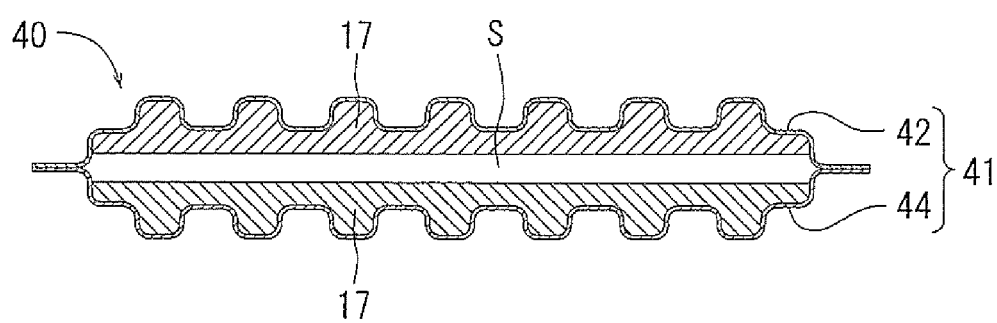

Alternatively, each of the heat storage members 40 can be formed by heating the phase-change material 17 at a temperature higher than the melting point of the gelator (e.g., 80-120° C.) in order to completely melt the phase-change material, pouring such melted phase-change material 17a into the insides of the upper panel 42 and the lower panel 44 as shown in FIG. 6A, cooling them in order to gelate or solidify the phase-change material 17 as shown in FIG. 6B, facing the upper panel 42 and the lower panel 44 each other as shown in FIG. 6C, and then welding the flange portion 42e of the upper panel 42 with the flange portion 44e of the lower panel 44.

Referring again to FIG. 1, a processing mechanism of fuel vapor by the canister having the heat storage members 40 and 50 will be described. Mixed gas $F_0$ of fuel vapor, which has been vaporized in the fuel tank, and air flows into the main chamber 24 through the tank port 241 of the canister 20 as shown by large arrows in FIG. 1. Then, the adsorbent 12 selectively adsorbs the fuel vapor in the mixed gas $F_0$, and air flows through the canister 20. When air and remaining fuel vapor, which is not adsorbed by the adsorbent 12 in the main chamber 24, flow into the second auxiliary chamber 25b through the diffusion space 26, the adsorbent 12 in the second auxiliary chamber 25b completely adsorbs the remaining fuel vapor, and air flows out through the air flow port 251. In this way, release of the fuel vapor into the atmosphere can be prevented.

When the adsorbent 12 adsorbs the fuel vapor, the temperature of the adsorbent 12 increases due to condensation heat of the fuel vapor, so that adsorption efficiency tends to decrease. However, because the canister 20 is equipped with the heat storage members 40 and 50, when the temperature in the canister 20 increases above the melting point of the phase-change material 17 (the melting point of paraffinic hydrocarbon), the phase-change material 17 absorbs heat in the canister during gelation so that temperature increase in the canister can be prevented. Thus, decrease in adsorption efficiency of the fuel vapor by the adsorbent 12 can be prevented. When the phase-change material 17 melts, the volume of the phase-change material 17 increases. However, because the space S is formed in each of the sealed containers 41 and 51, the space S can compensate for volume increase of the phase-change material 17 in order to prevent excessive stress on the sealed containers 41 and 51.

When the internal combustion engine is driven, for example, the vehicle is running, negative pressure from the vacuum pump, the air intake pipe or the like is applied to the main chamber 24, the diffusion space 26, the second auxiliary chamber 25b and the first auxiliary chamber 25a of the canister 20 via the purge port 242. So, air G flows into the first auxiliary chamber 25a of the canister 20 through the air flow port 251, and then flows through the second auxiliary chamber 25b, the diffusion space 26, the main chamber 24 and the purge port 242 into the air intake pipe as shown by bold arrows in FIG. 1. Accordingly, the fuel vapor adsorbed on the adsorbent 12 in the canister 20 is purged (i.e., is desorbed) and such purged fuel vapor $F_1$ flows into the air intake pipe together with air.

When the fuel vapor adsorbed on the adsorbent 12 is purged, the temperature of the adsorbent 12 decreases due to vaporization heat of the fuel vapor, so that desorption efficiency for the fuel vapor tends to gradually decrease. However, when the temperature in the canister 20 decreases below the melting point of the phase-change material 17, the phase-change material 17 solidifies and emits heat in order to prevent temperature decrease in the canister 20. Accordingly, decrease in the desorption efficiency of the fuel vapor from the adsorbent 12 can be prevented.

The invention claimed is:

1. A heat storage member housed in a canister together with an adsorbent capable of adsorbing fuel vapor, comprising:
   a sealed container; and
   a phase-change material housed in the sealed container, the phase-change material configured to become semi-solid gel state within the sealed container at the melting point of the phase-change material, and the phase-change material being disposed along an entire inner surface of the sealed container such that a space filled with an inert gas and configured to receive an expansion in volume of the phase-change material caused by phase-change is formed at a center of an inner space of the sealed container;
   wherein the phase-change material contains a gelator and at least one of C15-C18 paraffinic hydrocarbons; and
   wherein the gelator is olefin elastomer.

2. A heat storage member housed in a canister together with an adsorbent capable of adsorbing fuel vapor, comprising:
   a sealed container; and
   a phase-change material housed in the sealed container, the phase-change material configured to become semi-solid gel state within the sealed container at the melting point of the phase-change material, and the phase-change material being disposed along an entire inner surface of the sealed container such that a space sized and configured to compensate for a volume alteration of the phase-change material caused by phase-change is formed at a center of an inner space of the sealed container;
   wherein the phase-change material contains a gelator and at least one of C15-C18 paraffinic hydrocarbons; and
   wherein the gelator is olefin elastomer.

* * * * *